Aug. 23, 1932.  L. A. FRAYER  1,873,377
HOPPER FEED APPARATUS
Filed Nov. 23, 1929
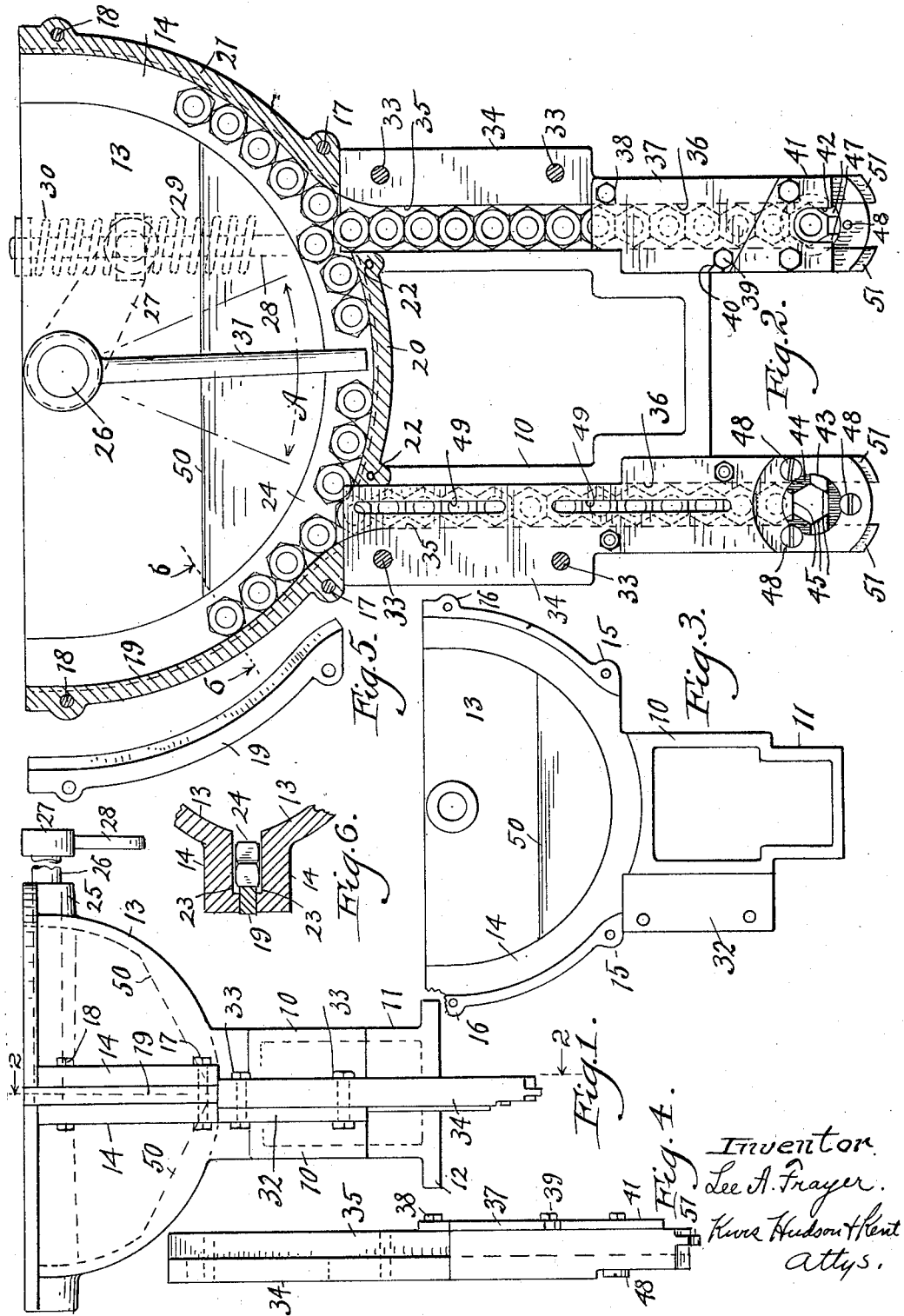

Patented Aug. 23, 1932

1,873,377

UNITED STATES PATENT OFFICE

LEE A. FRAYER, OF KENT, OHIO, ASSIGNOR TO ROY H. SMITH, OF KENT, OHIO

HOPPER FEED APPARATUS

Application filed November 23, 1929. Serial No. 409,276.

This invention relates to improvements in hopper feed apparatus, particularly apparatus for feeding small articles like nuts or nut blanks.

One of the objects of the invention is the simplification of apparatus of this character with a consequent reduction in cost and upkeep.

Another object is the provision of hopper apparatus adapted for the feeding of one or more columns of nuts or like articles.

Another object is the provision of a hopper split at the nut groove and adapted to be assembled with spacers of different dimensions, whereby the cross sectional dimensions of the groove may be varied to suit nuts of various sizes.

Other objects and features of novelty will appear as I proceed with a description of that embodiment of the invention which, for the purposes of the present application, I have illustrated in the accompanying drawing, in which Figure 1 is an elevational view of a nut hopper constructed in accordance with the present invention.

Fig. 2 is a larger scale elevational view, partly in section upon the line 2—2 of Fig. 1.

Fig. 3 is an elevational view of one of the two identical castings making up the hopper and its supporting base.

Fig. 4 is an edge or side elevational view of one of the nut chutes or galleys.

Fig. 5 is a perspective view of a spacer which may be employed in connection with the invention, and Fig. 6 is a fragmental detail sectional view taken substantially on the line 6—6 of Fig. 2.

The hopper of the present invention consists essentially of two halves, preferably iron castings, one of which is shown in Fig. 3 from its inner side. Each casting has a base portion 10 provided with a constricted lower end 11 having a foot 12 by means of which the apparatus may be bolted to any convenient support. Each casting also includes a bowl portion 13, the latter being provided with a semi-circular flange 14. This flange comprises bosses 15 and 16 which are perforated for the reception of bolts 17 and 18.

In assembling the hopper for use with nuts of any given width or thickness, spacers 19, 20 and 21 are interposed between the flanges of the two castings, the spacers 19 and 21 being provided with holes for the reception of bolts 17 and 18 and the spacer 20 being provided with similar holes for the reception of dowels 22 mounted in one of the castings. The spacers 19, 20 and 21 are of the same thickness for any given size of nut, and their inner surfaces conform for the most part to a circle the center of which is in the center of the hopper. Each of the flanges 14 is relieved on its inner surface, as indicated at 23 in Fig. 6, so that the spacers are gripped by the outer edges of the flanges only. A nut groove 24 is thus formed between the flanges 14 and above the spacers 19, 20, 21, the width and depth of this groove being determined by the thickness and width of the spacers.

Each of the castings is provided with a boss 25, extending both inwardly and outwardly of the bowl, which boss is bored to provide a bearing for a shaft 26 on the outer end of which is a crank 27 that may be oscillated by any suitable means, such as by a connecting rod 28 attached to the crank 27 by spring cushioning means 29 and 30, so that in the event of any jamming of the apparatus the rod 28 may move back and forth without moving the crank 27. The shaft 26 carries centrally of the bowl an agitator arm 31 which extends downwardly into the groove 24, as shown in Fig. 2. The driving mechanism is designed to impart oscillations to the arm 31 through approximately the angle A in Fig. 2.

Each of the two castings comprises on one side only a plate 32 extending laterally from the base 10. To this plate I secure by means of bolts 33 a nut galley or chute 34. This galley is provided with a rabbet 35 on its rear side extending as far as the bottom edge of the plate 32. Below that level the galley extends further inward to engage the lower end 11 of the base portion of the casing, and the rabbet 35 is continued as a groove 36 which extends down to the bottom end of the galley. This groove is covered by a thin plate 37, pivotally supported upon a pin or stud 38 and adapted to be held in operative position by a stud 39 which extends through a slot 40 in the plate. The latter may thus be quickly and easily swung to one side whenever it becomes desirable to get at the nuts in the groove 36. Below the plate 37 I mount upon the galley a further plate 41 which may have an arched opening 42 in the bottom adapted to retain the nut while permitting the reception of means for moving the nut laterally out of the galley.

The present invention is not concerned with the disposition of the nuts after they reach the lower end of the galleys. They may be fed directly downward if desired. However, if a lateral feed is employed it is desirable to provide a receiver and nut holder at the lower extremity of the galley. To this end I may make a cylindrical opening 43 through the galley from front to rear in which can be mounted such a receiver and holder 44. The holder proper is located behind the groove 36 and has an opening provided with three surfaces 45 to hold a nut against rotation, and the receiver consists of two parts 47 projecting forwardly into the groove 36, their upper surfaces constituting continuations of two of the surfaces 45 of the holder, so that when a nut has been received upon the parts 47 it may be slid laterally into the holder. This receiver and holder 44 may be retained in position in its opening 43 by means of screws 48 or the like. The galley, on its side opposite the plate 32 in line with the rabbet 35 and groove 36 is slotted as at 49, permitting inspection of the nuts in the galley.

The shape of the hopper bowl is generally hemispherical, and the groove 24 corresponds to a great circle of the sphere. However I may form the inner walls of each casting with flat surfaces 50 leading down to the groove in order to facilitate the movement of nuts by gravity thereinto. There are two bosses 25 arranged in alignment when the parts are assembled. The shaft 26 may have bearing in both of these bosses, or it may terminate in the middle of the hopper just beyond the point of connection with the agitator arm 31. Of course it will be appreciated that while my invention adapts itself readily to the feeding of nuts in two columns as shown herein, it is equally applicable for feeding nuts or other small articles in a single column or in more than two columns. At the bottom of each galley I may provide, upon opposite sides of the groove 36, fins or flanges 51, adapted to fit in notches provided in some portion of the machine upon which the apparatus is to be employed.

In Fig. 2 the hopper is shown nearly empty. When feeding is started the hopper will naturally be well filled, and the operator will shovel in or otherwise add further nuts as the run proceeds. The agitator arm 31, in swinging through the arc A, imparts more or less movement to all of the nuts in the hopper, this movement decreasing toward the upper portions of the mass. The nuts arrange themselves in the groove 24, which is of the proper width and depth to receive them and keep them in alignment. The arm 31, swinging about a center concentric with the groove 24, causes the nuts in the groove to travel back and forth, thereby facilitating the entry of additional nuts into the groove to take the place of those withdrawn therefrom. As a nut is withdrawn from the lower end of either galley, the column of nuts therein descends and another nut enters the galley from the groove 24. It will be noted that the lower end of each spacer 19 and 21 is curved downwardly, and that this curve registers with the flared upper end of the corresponding rabbet 35 to provide an easy path of travel between the groove and rabbet. It is necessary to provide special galleys for each size of nut to be fed, the rabbet 35 and groove 36 being proportioned to properly receive and feed such nut. When the apparatus is to be set up for a different size nut from that previously fed, the bolts 17 and 18 are removed and the two castings separated far enough to permit the withdrawal of spacers 19, 20 and 21. The bolts 33 are then removed from each casting, permitting the removal of the galleys 34, after which spacers and galleys designed for the size of nut next to be fed, are put in place. The parts being then reassembled the apparatus is again ready for operation.

While in the foregoing description and in the accompanying drawing I have disclosed one embodiment of the invention more or less in detail, I desire it to be understood that such detail disclosure is resorted to primarily for the purpose of fully illustrating the invention, and is not to be construed as amounting to a limitation upon the scope thereof.

Having thus described my invention, I claim:

1. In apparatus of the class described, a hopper having in the bottom thereof an inclined groove adapted to receive nuts on edge only, a nut galley opening into said groove between the upper and lower ends thereof, and means movable within the lower part of said groove in opposite directions alternately for causing the travel of nuts toward said galley from opposite directions.

2. In apparatus of the class described, a hopper having in the bottom and side thereof a groove of arcuate form adapted to receive nuts on edge only, a nut galley opening into said groove between the upper and lower ends thereof, and an arm mounted with its outer end projecting into the lower portion of said groove to swing in the plane thereof.

3. In apparatus of the class described, a hopper having an inner inclined wall, said wall having a groove therein extending downwardly toward the bottom of the hopper adapted to receive nuts on edge only, a nut galley communicating with said groove at a point part way down said wall, and agitating means moving back and forth in said groove below said galley.

4. In apparatus of the class described, a hopper having in the bottom and in opposite inclined sides thereof a groove adapted to receive nuts on edge only, two nut galleys opening into said groove at spaced points thereof, and agitating means movable back and forth in said groove between said spaced points.

5. In apparatus of the class described, a hopper having therein a semi-circular groove extending from side to side of the inner wall of the hopper, said groove being adapted to receive nuts on edge only, a pair of nut galleys communicating with said groove on opposite sides of the center of the hopper, and agitating means movable back and forth within the lower central portion of said groove.

6. In apparatus of the class described, a hopper formed of two identical halves adapted to be bolted together, each half carrying a depending plate adjacent the plane of juncture of the halves to one side of the center of the hopper, a nut galley bolted to each of said plates, and means for securing said halves together leaving the upper ends of said galleys open to the interior of the hopper.

7. In apparatus of the class described, a hopper having in the bottom thereof a groove of arcuate form adapted to receive nuts on edge only, a nut galley opening into said groove near the lower end thereof, an arm mounted at the center of the arc of said groove with its outer end moving therein, and means for swinging said arm back and forth, said means comprising a cushioning element adapted to yield when the movement of the nuts in said groove is blocked.

8. In apparatus of the class described, a hopper having therein a semi-circular groove extending from side to side of the inner wall of the hopper, said groove adapted to receive nuts on edge only, a pair of nut galleys communicating with said groove on opposite sides of the center of the hopper, a swinging arm having its free end extending into said groove between said galleys, and a flexible driving means for said arm adapted to yield when the movement of the nuts in the groove on either side of the arm is blocked.

In testimony whereof, I hereunto affix my signature.

LEE A. FRAYER.